United States Patent
Backer et al.

(10) Patent No.: US 7,964,261 B2
(45) Date of Patent: Jun. 21, 2011

(54) ADVANCED ANTIBALLISTIC MATERIALS

(75) Inventors: Jan Adolph Dam Backer, Nijnsel (NL); Benjamin Slager, Rhenen (NL); Bart Clemens Kranz, Reek (NL)

(73) Assignee: Novameer B.V., Veghel (NL)

( * ) Notice: Subject to any disclaimer, the term of this patent is extended or adjusted under 35 U.S.C. 154(b) by 0 days.

(21) Appl. No.: 12/733,930

(22) PCT Filed: Oct. 7, 2008

(86) PCT No.: PCT/EP2008/063368
§ 371 (c)(1),
(2), (4) Date: Mar. 29, 2010

(87) PCT Pub. No.: WO2009/047239
PCT Pub. Date: Apr. 16, 2009

(65) Prior Publication Data
US 2010/0247847 A1    Sep. 30, 2010

(30) Foreign Application Priority Data

Oct. 9, 2007 (EP) .................................... 07019742

(51) Int. Cl.
*B29C 65/00* (2006.01)
*B32B 37/10* (2006.01)
*B32B 37/22* (2006.01)

(52) U.S. Cl. ..................... 428/114; 139/383 R; 156/164; 156/194; 156/304.6; 428/107; 428/156; 428/213; 428/364; 429/144

(58) Field of Classification Search .................. 428/114, 428/156, 213, 364; 139/383, 383 R; 156/194, 156/164; 429/144; 256/304.6
See application file for complete search history.

(56) References Cited

U.S. PATENT DOCUMENTS

| | | | |
|---|---|---|---|
| 4,309,487 A | | 1/1982 | Holmes |
| 5,677,029 A | * | 10/1997 | Prevorsek et al. ............ 428/113 |
| 2003/0200861 A1 | * | 10/2003 | Cordova et al. ............. 89/36.02 |
| 2005/0153098 A1 | | 7/2005 | Bhatnagar et al. |
| 2007/0117483 A1 | * | 5/2007 | Bhatnagar et al. ............ 442/123 |

FOREIGN PATENT DOCUMENTS

| | | |
|---|---|---|
| EP | 0 805 332 A2 | 11/1997 |
| WO | WO 2006/107197 A1 | 10/2006 |
| WO | WO 2006107197 A1 * | 10/2006 |
| WO | WO 2006/136323 A1 | 12/2006 |
| WO | WO 2008/040506 A1 | 4/2008 |
| WO | WO 2008/040509 A2 | 4/2008 |
| WO | WO 2008/040510 A1 | 4/2008 |
| WO | WO 2008/040511 A1 | 4/2008 |

OTHER PUBLICATIONS

International Search Report and Written Opinion for International Application No. PCT/EP2008/063368, mailed on Jan. 13, 2009.
International Preliminary Report on Patentability for International Application No. PCT/EP2008/063368, Sep. 2, 2009.

* cited by examiner

*Primary Examiner* — Brent T O'Hern
(74) *Attorney, Agent, or Firm* — Oliff & Berridge, PLC

(57) ABSTRACT

A stack having at least one layer of tapes and at least one layer of multifilament yarn.

17 Claims, No Drawings

ADVANCED ANTIBALLISTIC MATERIALS

The invention pertains a stack comprising at least one layer of multifilament yarns, in particular for anti ballistic applications. Combinations wherein layers of multifilament yarns are used to achieve anti ballistic performances are known e.g. from US 2005/0153098. This publication describes stacked layers in the form of a crossply of layers of multifilament yarns. In order to protect the filaments from deterioration by rubbing or in use PET and PC films on the outside of this stack are applied.

Although the stacked layers of multifilament yarns of the prior art show good antiballistic performances, their cost-prices are often very high and also the processes of manufacturing the required yarns are complicated and both time and cost consuming.

As a consequence, there is a need for alternatives that are cheaper and easier to manufacture and which alternatives still have properties that enables them for antiballistic applications.

Surprisingly, the object of the invention can be achieved with a stack of at least one layer of multifilament yarns and at least one layer of tapes.

Throughout this description, the term "multifilament yarns", also referred to below simply as "yarns", refers to linear structures consisting of two or more filaments of in principle endless length. Such multifilaments are known to the skilled person. There is in principle no restriction on the number of individual filaments comprising a multifilament yarn. A multifilament generally comprises between 10 and 500 filaments, and frequently between 50 and 300 filaments.

Multifilament yarns for anti ballistic applications are usually yarns from the ultra high molecular weight polyethylene (UHMWPE) or aramid (poly paraphenylene terephthalamide) type, however, also other high performance fibers as mentioned below can be applied.

In the course of this invention a "layer of multifilament yarns" should be understood as one layer of (spread) multifilament yarns in one direction.

Under the term "crossply" at least two layers are to be understood, which layers have directions deviating from each other in an angle from 0 to 90°, i.e. the layers are not parallel to each other.

Further, with the term "laminate" a combination of at least two crossplies in a flexible manner is meant, such as combining two or more crossplies by means of e.g. sewing. In contrast to that, with the term "panel" or "plate" combinations of two or more crossplies in a rigid manner is meant, which can be achieved e.g. by applying pressure and temperature to the stack of crossplies.

With the term "tape" a highly drawn slitted film, an extruded mono-polymer, or bicomponent extruded drawn slitted films or co-extruded multilayer "monofilament", a so called SSE (solid state extruded) highly drawn film known as e.g. Tensylon, Pamaco and other equivalents is meant. Important is a tape strength between 50 cN/tex and 500 cN/tex and a "thickness to width" ratio between 1:2 and 1:100.000, preferably between 1:10 and 1:10000. Examples of suitable tapes are disclosed in WO 2006/107197 and in applicant's unpublished applications No. PCT/EP2007/008495, PCT/EP2007/008500, PCT/EP2007/008499, and PCT/EP2007/008498.

With "UD-0" (uni-directional with an angle of 0°) one layer of plane parallel positioned tapes is meant, e.g. positioned next to each other (shoulder to shoulder or side by side).

A layer of "UD-brick" consists of two layers of "UD-0" parallel positioned above each other with an offset of ca. 50% of the width of the tape.

Accordingly, a UD-brick crossply is a 0-90 degree stack of at least two layers of UD-bricks which layers have directions deviating from each other in an angle from 0 to 90°, i.e. the layers are not parallel to each other.

For the tapes preferably polymers, such as PP, PE, HDPE, PET, PA, PPS, PBO, HDPP, UHMWPE, UHMWPP, HDPA, UHMWPA are used. The most common polymers for these tapes are polyethylene, polypropylene, PET (Polyethylene terephthalate), PEN (Polyethylene Naphthalate), Polyamide, PPS and/or mixtures thereof.

In the course of the invention, HDPE can be defined as drawn polyethylene with a molecular weight of less than 1,000,000, preferably produced by meltspinning.

UHMWPE can be defined as polyethylene with a molecular weight of more than 1,000,000.

The invention is to supply stack of layers of multifilaments yarns and tapes in all possible combinations.

Preferably the inventive stack comprises more than two individual layers.

In a preferred embodiment the stack comprises one individual layer of tape, then a layer of multifilament yarns, and again a layer of tapes, i.e. alternating layers of tapes and multifilament yarns.

In a further preferred embodiment the stack of the invention comprises a small number of one kind of layers of tape, followed by a small number of layers of one or more kinds of multifilament yarns. In the framework of the present invention the term "small number of layers" should be understood as 2 to 20 layers, preferably 3 to 15 layers and more preferably 5 to 10 layers. The small number of tape layers may be different from the small number of multifilament layers. Preferably there are equal numbers of tape layers and multifilament yarn layers.

Combinations of the embodiments described above are also encompassed.

The tape layer can be present in its UD-0 form or as UD-brick. Both the layer(s) of multifilament yarns and the layer(s) of tape can be present as double- and/or multilayer crossply.

The layers of multifilament yarns can consist of the family of para-aramid multifilament yarns, known and sold under the trade names like e.g. Twaron, Kevlar, Heracron, Pycap or Artec, high strength polyethylene multifilament yarns like Dyneema, Spectra or the various Chinese UHMWPE multifilament yarns, high strength glass multifilament yarns known as E-glass, R-glass and S-glass. Furthermore other high performance multifilament yarns like carbon multifilament yarns, HS basalt multifilament yarns; polybenzoxazole (PBZO) multifilament yarns, polybenzothiazole (PBZT) multifilament yarns, HDPA multifilament yarns, UHMWPA multifilament yarns, UHMWPP multifilament yarns, HDPP multifilament yarns, HDPE multifilament yarns etc; basically any multifilament high strength yarn with a strength above 60 cN/tex as they are in use in this anti-ballistic and "life protection" industry or composite industry can be applied.

It is preferred though, that the single filaments have a small diameter, preferably between 3 microns and 50 microns (μm), even more preferably between 5 and 30 microns. Also, one or more combinations of these multifilament yarns can be used together in one or more of the layers of multifilament yarns.

One aspect of the stack according to the invention is the relatively low adhesion between and/or within the various layers, caused by a low adhesive or resin content in the layers. Preferred are adhesive contents between 2% and 30%, more preferably between 5 and 12%, of the weight of the total stack, leaving—even under high pressures and heat, e.g. a pressure of five MPa or more and a temperature of 100° C. or more during the manufacturing of the crossply, laminate or panel—some or better most filaments "un-bonded" within the stack.

Preferred adhesives or resins are e.g. lattices of Kraton, PU, Acrylics, but also dispersions of EAA, EMA, EVA, OBC (Olefin Block Copolymer) (Infuse® DOW) etc. or various solvent based/water based adhesives with chloroprene and alike. Further suitable adhesives may be selected from the group consisting of polyethylene, ultra high molecular weight polyethylene, polypropylene, polyamide, polybutadiene terephthalate and polyethylene terephthalate, polyethylene naphtalate, polyvinyl alcohol, polyphenylidensulfide, copolymers of these polymers and mixtures thereof. In addition ethylene alkyl acrylate copolymer (EAA), ethylene vinyl acetate copolymer (EVA), ethylene-butyl acrylate copolymer (EBA), ethylenemethyl acrylate copolymer (EMA), linear low density polyethylene (LLDPE), high density polyethylenes (HDPE), low density polyethylenes (LPDE) may be used. It is also possible to use polyisobutylene (PIB) or polyurethane (PU) and mixtures thereof. The adhesive or resin material may comprise one of the listed materials or mixtures of those materials.

The volume ratio of the layers of multifilament yarns and the layers of tapes should be between 1:99% and 99:1%, preferably between 30:70 and 70:30, most preferably between 33:67% and 67:33%, this depending on the desired ballistic performance and the allowed maximum weight and of course the cost per unit.

Further preferred embodiments of the present inventions are the following stacks, which can finally become crossplies, laminates or panels.

A stack which comprises at least one layer of HDPE-tapes and at least one layer of aramid multifilament yarns.

A stack which comprises at least one layer of HDPE-tapes and at least one layer of UHMWPE multifilament yarns.

A stack which comprises at least one layer of UHMWPE-tapes and at least one layer of aramid multifilament yarns.

A stack which comprises at least one layer of HDPE-tapes and at least one layer of aramid multifilament yarns and at least one layer of UHMWPE multifilament yarns.

A stack which comprises at least one layer of UHMWPE-tapes and at least one layer of aramid multifilament yarns and at least one layer of UHMWPE multifilament yarns.

A stack which comprises at least one layer of HDPE-tapes and at least one layer of basalt multifilament yarns.

A stack which comprises at least one layer of UHMWPE-tapes and at least one layer of basalt multifilament yarns.

The stacks of the present invention as well as the resulting panels or laminates exhibit performance improvement and/or cost improvement over the prior art materials since tapes, in particular meltspun but also others, can be produced at lower costs than multifilament yarns.

The stacks according to the invention and the resulting laminates and panels can be applied in antiballistic applications as well as in composite applications, stand-alone or in combination with other materials. Laminates can be used for soft ballistic applications, e.g. vests and so on.

The panels can be used for hard ballistics purposes like panel in cars or trucks, inserts and so on. These panels can also be used behind a hard strike surface, from e.g. metals, metal alloys, glass basalt fibers, glass fibers, and ceramics, e.g. aluminum oxide, boron carbide.

Two or more hard strike surface layers (e.g. from ceramic or steel) can also be combined with two or more of the panels, such as e.g. sandwiching the hard strike surface layers by the panels.

The low adhesive content in the stack according to the invention, which has by nature a relatively high specific surface due to the many very small diameter filaments, in combination with the relatively small specific surface of the tapes, helps to absorb energy by delamination upon impact. The multifilament yarns and tapes separate from each other when hit by e.g. a bullet which enables the energy to be absorbed and dissipated.

A possible variation is to connect the layers to each other by surface-fusing of the material within the stack with the lowest melting temperature to achieve a bonding of the layers in the stack.

The high performance multifilament yarns like UHMWPE and para aramid tend to be more expensive than e.g. the highly drawn slitted film tapes, thus in certain "low cost" applications the ratio will be in favor of the higher tape-layer content, reducing the over-all price of the stack and the resulting panel or laminate.

The mechanical performances of the HDPE tapes with a tensile strength of 1700 MPa (as shown in the example below) are lower than the mechanical properties of the multifilament yarns like Aramid (with 2800 MPa). However, similar or nearly similar anti ballistic effects can be realized as with the materials of the prior consisting of 100% of multifilament yarns.

EXAMPLE

A panel of a 50/50 ratio by weight of layers of HDPE UD-brick tape and crossplies from (spread) aramid multifilament yarns can withstand nearly similar impact energy of a bullet as an equally heavy all-aramid multifilament yarn panel, due to the slippage effect and favorable energy dissipation of the panel.

The stack was constructed as follows:
Stack:
Adhesive 4 μm
HDPE UD-brick (80 gr layer, 35 μm HDPE 0°, 8 μm adhesive, 35 μm HDPE 0°)
Adhesive 4 μm
Aramid 90-0 (80 gr layer, 38 gr aramid 90°, 4 μm adhesive, 38 gr aramid 0°)
Adhesive 4 μm
HDPE UD-brick (80 gr layer, 35 μm HDPE 90°, 8 μm foil, 35 μm HDPE 90°)
Adhesive 4 μm
Aramid 0-90 (80 gr layer, 38 gr Aramid 0°, 4 μm adhesive, 38 gr Aramid 90°)

The invention claimed is:

1. An antiballistic material comprising a stack comprising at least one layer of tapes exhibiting a strength between 50 cN/tex and 500 cN/tex and at least one layer of multifilament yarns having a strength above 60 cN/tex in one direction, the multifilament yarns comprising a plurality of individual filaments, wherein the at least one layer of tapes is present in its uni-directional with an angle of 0° form,
the stack exhibits an adhesive content between 2% and 30% of the weight of the total stack leaving most of the individual filaments of the multifilament yarns un-bonded within the stack, and wherein the multifilament yarns and tapes are capable of delaminating from each other when hit by a projectile.

2. The stack according to claim 1, wherein the stack comprises one individual layer of tapes, then a layer of multifilament yarns, followed by a second layer of tapes.

3. The stack according to claim 1, wherein the stack comprises 2 to 20 of one kind of layers of tapes, followed by 2 to 20 layers of one or more kinds of multifilament yarns.

4. The stack according to claim 2, wherein the stack comprises equal numbers of at least one layer of tapes and at least one layer of multifilament yarns.

5. The stack according to claim 1, wherein tapes of the at least one layer exhibit a thickness to width ratio between 1:2 and 1:100,000.

6. The stack according to claim 1, wherein tapes of the at least one layer of tapes comprise polymers are selected from the group consisting of polyethylene, high density polyethylene, ultra high molecular weight polyethylene, polypropylene, high density polypropylene, ultra high molecular weight polypropylene, polyethylene terephthalate, polyethylene naphthalate, Polyamide, high density polyamide, ultra high molecular weight polyamide, polyphenylene sulfide, poly p-phenylenebenzobisoxazole, and mixtures thereof.

7. The stack according to claim 1, wherein the at least one layer of multifilament yarns consist of aramid multifilament yarns, selected from the group consisting of polyethylene multifilament yarns having a strength above 60 cN/tex, ultra high molecular weight polyethylene multifilament yarns, glass multifilament yarns known as E-glass, R-glass and S-glass having a strength above 60 cN/tex, carbon multifilament yarns, basalt multifilament yarns having a strength above 60 cN/tex, polybenzoxazole multifilament yarns, polybenzothiazole multifilament yarns, high density polyamide multifilament yarns, ultra high molecular weight polyamide multifilament yarns, ultra high molecular weight polypropylene multifilament yarns, high density polypropylene multifilament yarns, high density polyethylene multifilament yarns, and combinations thereof.

8. The stack according to claim 1, wherein the at least one layer of tapes is present in its uni-directional brick form, where the uni-directional brick form consists of two layers of parallel uni-directional with an angle of 0° form positioned above one other with an offset of 50% of a width of the tape.

9. The stack according to claim 1, wherein the at least one layer of multifilament yarns and the at least one layer of tapes are present as double- and/or multilayer crossply.

10. The stack according to claim 1, wherein a diameter of the individual filaments of the multifilament yarns is between 3 and 50 microns (μm).

11. The stack according to claim 1, comprising adhesives selected from the group consisting of polyurethane, Acrylics, dispersions of ethylene alkyl acrylate copolymer, ethylenemethyl acrylate copolymer, ethylene vinyl acetate copolymer, olefin block copolymer, polyethylene, ultra high molecular weight polyethylene, polypropylene, polyamide, polybutadiene terephthalate, polyethylene terephthalate, polyethylene naphtalate, polyvinyl alcohol, polyphenylidensulfide, ethylene alkyl acrylate copolymer, ethylene vinyl acetate copolymer, ethylene-butyl acrylate copolymer, ethylenemethyl acrylate copolymer, linear low density polyethylene, high density polyethylenes, low density polyethylenes, polyisobutylene, polyurethane, copolymers of these polymers, and mixtures thereof.

12. The stack according to claim 1, wherein a volume ratio of the at least one layer of multifilament yarns and the at least one layer of tapes is between 1:99% and 99:1%.

13. The stack according to claim 1, wherein the at least one layer of multifilament yarns and the at least one layer of tapes are connected to each other by surface-fusing of material within the stack having the lowest melting temperature to achieve a bonding of the at least one layer of multifilament yarns and the at least one layer of tapes in the stack.

14. A crossply comprising the stack according to claim 1.

15. A laminate comprising the stack according to claim 1.

16. A panel comprising the stack according to claim 1.

17. A composite comprising the panel according to claim 16.

* * * * *